United States Patent [19]

Breton et al.

[11] Patent Number: 5,129,948
[45] Date of Patent: Jul. 14, 1992

[54] INK FOR INK JET PRINTING

[75] Inventors: Marcel P. Breton, Mississauga; Melvin D. Croucher, Oakville; Kerstin M. Henseleit, Toronto; Barbel Helbrecht, Oakville; Fatima M. Pontes, Mississauga, all of Canada

[73] Assignee: Xerox Corporation, Stamford, Conn.

[21] Appl. No.: 701,242

[22] Filed: May 16, 1991

[51] Int. Cl.$^5$ ............................................. C09D 11/02
[52] U.S. Cl. ........................................ 106/22; 106/20; 524/190; 524/612
[58] Field of Search ............... 106/23, 499, 20, 22; 524/190, 612; 260/DIG. 38

[56] References Cited

U.S. PATENT DOCUMENTS

| | | | |
|---|---|---|---|
| 4,072,462 | 2/1978 | Vellins et al. | 106/22 |
| 4,074,034 | 2/1978 | Soga et al. | 526/56 |
| 4,150,997 | 4/1979 | Hayes | 106/22 |
| 4,154,618 | 5/1979 | Burke | 106/27 |
| 4,163,001 | 7/1979 | Carumpalos et al. | 106/20 |
| 4,352,691 | 10/1982 | Owatari et al. | 106/22 |
| 4,378,564 | 3/1983 | Cross et al. | 106/20 |
| 4,508,570 | 4/1985 | Fujii et al. | 106/22 |
| 4,530,961 | 7/1985 | Nguyen et al. | 106/20 |
| 4,659,382 | 4/1987 | Kang | 106/22 |
| 4,740,549 | 4/1988 | Okuzono et al. | 106/20 |
| 4,789,400 | 12/1988 | Solodar et al. | 106/22 |
| 4,836,852 | 6/1989 | Knirsch et al. | 106/22 |
| 4,838,938 | 6/1989 | Tomida et al. | 106/22 |
| 4,847,316 | 7/1989 | Schick et al. | 524/88 |
| 4,853,036 | 8/1989 | Koike et al. | 106/20 |
| 4,889,877 | 12/1989 | Seitz | 106/20 |
| 4,923,515 | 5/1990 | Koike et al. | 106/22 |
| 5,017,644 | 5/1991 | Fuller et al. | 106/23 |

OTHER PUBLICATIONS

C. A. Bruce, "Dependence of Ink Jet Dynamics on Fluid Characteristics" IBM J. Res. Develop., pp. 258-270, May, 1976.
B. L. Beach et al., "Materials Selection for an Ink Jet Printer," Ink Jet Printer Materials, pp. 75-80, Jan., 1977.
C. T. Ashley, "Development and Characterization of Ink for an Electrostatic Ink Jet Printer", Jet Printer Ink, pp. 69-74, Jan., 1977.
A. Naka et al., "Ability of Surfactants to Form Highly Loaded Coal-Water Mixtures JAOCS", vol. 65, No. 7 (Jul. 1988), pp. 1194-1201.
"The Jeffamine Polyoxyalkyleneamines"-Texaco Chemical Company, 1987 M. Ozaki et al., Fixing Time of Ink-Jet Inks on Plain Paper SPIE vol. 1079 Hard Copy Output (1989), pp. 384-388.
Alkateric-Amphoterics, pp. 18-19.
Rexol 130-Technical Bulletin TM-86-008, pp. 1-4.
Texaco Chemical Company, Copyright 1987, The Jeffamine Polyoxyalkyleneamines.

Primary Examiner—William R. Dixon, Jr.
Assistant Examiner—Helene K. Klemanski
Attorney, Agent, or Firm—Oliff & Berridge

[57] ABSTRACT

An ink composition, preferably for ink jet printing, contains a liquid carrier, a colorant, and a polyalkyleneimine/alkylene oxide block copolymer, preferably polyethyleneimine/propylene oxide/ethylene oxide block copolymer, and/or a primary or secondary polyoxyalkylene amine.

27 Claims, No Drawings

INK FOR INK JET PRINTING

BACKGROUND OF THE INVENTION

1. Field of the Invention

This invention relates to ink jet printing, and more particularly, to ink compositions for ink jet printers

2. Description of Related Art

Ink compositions, especially those for use with ink jet printers, must satisfy a number of conditions in order to achieve acceptable printing.

The ink composition should possess properties which permit it to be jetted appropriately from an ink jet printer. In ink jet printing, droplets of ink are expelled from nozzles onto a recording medium. The ink should form a meniscus at each nozzle prior to being expelled in the form of a droplet. After a droplet is expelled, additional ink surges to the nozzle to reform the meniscus. Important properties of the ink in this context include the ink's viscosity and surface tension.

Further, in many applications, fast drying inks are desired. However, the drying time of the ink should not be such that it dries in the nozzle of the ink jet printer, thus clogging the nozzle. On the other hand, slow drying inks have limited use in printers requiring high throughput.

Generally, adjustment of the viscosity of an ink composition can negatively affect the print quality and/or drying time of the ink. This may result in excessive feathering or wicking along the paper fibers due to capillary action and longer drying times, which can result in variations in the boundary of characters or edge raggedness. Adjustments to the surface tension to improve a certain characteristic of the ink may adversely affect other characteristics thereof.

Other desirable properties for ink jet ink compositions include good water fastness and latency. Latency is the maximum time period, usually less than one hour and most often less than 10 minutes, over which an uncapped ink jet printhead can remain idle before noticeable deterioration of its jetting performance occurs.

A number of ink compositions for ink jet printing have been proposed.

U.S. Pat. No. 4,508,570 to Fujii et al. discloses an aqueous ink comprising a water-soluble dye; a polyhydric alcohol and/or an alkyl ether; water; and at least one water-soluble non-ionic surface active agent. The non-ionic surface active agent may comprise a polyoxyethylene alkyl amine, polyoxyethylene alkyl phenyl ether, and polyoxyethylene alkyl ether. The disclosed polyoxyethylene alkyl amine is a tertiary amine.

U.S. Pat. No. 4,923,515 to Koike et al. discloses a recording liquid composition comprising water, an organic solvent, and a water-soluble dye. The organic solvent may include block copolymers of ethylene oxide and propylene oxide.

U.S. Pat. No. 4,853,036 to Koike et al. discloses an ink composition comprising a liquid composition, a volatile solvent, and solid material. The solid material may comprise polyethylene glycol, polyoxyethylene alkyl ethers, polyoxyethylene alkylphenyl ethers, and polyoxyethylene/polyoxypropylene block copolymers.

Although the ink compositions of the prior art provide inks with certain advantageous qualities, it is desirable to provide inks having good print quality in which the drying times may be adjusted while also maintaining good water fastness and latency.

SUMMARY OF THE INVENTION

It is an object of the invention to provide a method for adjusting the drying times of ink compositions.

It is also an object of the invention to provide ink compositions having fast drying times while maintaining good print quality.

A further object of the invention is to provide an ink composition having acceptable water fastness and latency properties.

These and other objects of the invention are achieved with an ink composition which comprises a liquid vehicle, a colorant, and at least one additive selected from the group consisting of polyalkyleneimine/alkylene oxide (preferably polyethyleneimine/propylene oxide/ethylene oxide) block copolymer and a primary or secondary polyoxyalkylene amine. The present invention also provides a method of adjusting the drying time of inks which includes the addition of certain polyalkyleneimine/alkylene oxide block copolymers and/or polyoxyalkylene amines to an ink jet ink composition.

DETAILED DESCRIPTION OF PREFERRED EMBODIMENTS

The present invention provides ink compositions having reduced drying times while maintaining good print quality. The ink compositions of the present invention contain at least one of a polyalkyleneimine/alkylene oxide block copolymer, preferably a polyethyleneimine(PEI)/propylene oxide(PO)/ethylene oxide(EO) block copolymer, and a primary or secondary polyoxyalkylene amine. The addition of these components to the ink compositions reduces the drying time of the ink compositions while maintaining good print quality. Generally, the ink compositions of the present invention also comprise an ink vehicle, such as water or a mixture comprising water and a water soluble or water miscible organic solvent, and a colorant soluble therein.

Generally, the ink compositions of the invention may contain about 80% to about 99% by weight of the ink vehicle, about 1% to about 8% by weight of the colorant, about 0.01% to about 8% by weight of at least one of the polyalkyleneimine/alkylene oxide block copolymer and/or a primary or secondary polyoxyalkylene amine, and about 0.01% to about 2% by weight of other additives, based on weight of the total composition. The ink compositions of the invention should have a surface tension ranging from about 30 to about 60 dynes/cm, and a viscosity of about 1.1 to about 5 centipoise.

The polyalkyleneimine block may comprise alkylene groups having from 1 to about 4 carbon atoms. The alkylene oxide block may have from 1 to about 4 carbon atoms. Higher numbers of carbon atoms may render the copolymer insoluble in water. Examples of alkylenes include ethylene, propylene, isopropylene, butylene, and the like.

Preferred polyalkyleneimine/alkylene oxide block copolymers of the invention include polyethyleneimine/propylene oxide/ethylene oxide (PEI-PO-EO) block copolymers. The PEI-PO-EO block copolymers of the present invention may have molecular weights of about 1000 or more, preferably 5000 or more, and more preferably between about 5000 and about 300,000. The proportion of EO in the block copolymer may range from about 10 to about 100 mole percent (when no propylene oxide is present), and preferably ranges from about 16 to about 100 mole percent. Thus, the PEI block may have from about 600 to about 5000 monomer units, and preferably from about 600 to about 2000 monomer units. The PO block may have from about 0 to about 1000 monomer units, and preferably from about 0 to about 600 units. The EO block may have from about 600 to about 3000 monomer units, and preferably from about 600 to about 1500 monomer units.

The polyalkyleneimine/alkylene oxide block copolymers can be prepared by adding alkylene oxide segment(s) to the polyalkyleneimine which forms the backbone of the block copolymer. For example, the PEI-PO-EO block copolymers of the invention can be prepared by a three stage process. First, a branched or linear PEI backbone is prepared; then a PO segment of controlled molecular weight is attached to the PEI backbone if PO is present; and finally an EO segment is attached to the PO. If a PO segment is not utilized, the EO segment is attached to the PEI backbone.

PEI-PO-EO block copolymers are available from DKS International under the trade name Discole®. They are usually prepared by adding sequentially PO and EO to branched PEI (see A. Naka, S. Honjo, H. Sugiyama, Y. Nishida and O, Murakami, JAOCS, vol. 65, no. 7, 1194–1201, 1988). They are multi-chain-type nonionic surface active agents of HLB value (balance in strength between hydrophilic groups and hydrophobic groups) ranging from 3 to 20. Commercial samples of Discole® are available in molecular weights ranging from 20,000 to 300,000. Discole®-type materials of molecular weight as low as 5,000 are also available from DKS International. The EO content in the polymers is as low as 16% and as high as 100%. Other alkyleneoxides can be used instead of EO in order to impart different properties to the polymers. These alkyleneoxides may have from 1 to about 4 carbon atoms. An example of a block copolymer suitable for use in the present invention is Discole® PEI(600)-PO(560)-EO(1400) which has a moderate molecular weight polyamine as a base compound, an EO content of 65% and a molecular weight of 90,000. Other Discole® products include N-503, N-506, N-509, N-512, N-515, N-518 and N-520 which have a low molecular weight polyamine as the base compound, EO content ranging from about 16% to 100% and molecular weights ranging from about 20,000 to about 80,000. Discole W-3225 and W-206 have a high molecular weight polyamine as the base compound and alkylene oxide content of 75% and 28% respectively, and molecular weights of 300,000 and 90,000 respectively.

When the polyalkyleneimine/alkylene oxide block copolymer of the present invention is utilized in an ink composition, it is present in an amount ranging from about 0.01% to about 8% by weight, and more preferably in an amount ranging from about 0.1% to about 5% by weight. It is preferred that the block copolymer is added in an amount such that the viscosity of the ink composition is not greater than about 2.5 centipoise. Viscosities lower than 2.5 centipoise are usually recommended for use in a thermal ink jet printer. Higher viscosities usually result in lower maximum jetting frequencies, e.g., less than 5 kHz. This narrows the operating range of the printer and limits the speed at which the ink jet printer can print. Similarly, high concentrations of polymers such as PEI-PO-EO increase the viscosity of the ink drastically, due to water evaporation at the ink jet nozzle. Thus, the ink may form a viscous plug in the nozzle very easily and consequently the ink will have poor jetting and latency properties.

The primary and secondary polyoxyalkylene amines of the invention may be represented by the formula A-B$_y$-C, wherein A R$^1$NH(C$_n$H$_{2n}$), B=alkoxy which may be represented as OC$_n$H$_{2n}$, C=NHR$^2$, y=1 to a value to impart a molecular weight of about 6000 to the composition, where if y is greater than 1 the alkoxy may be the same or different, n =1 to about 4, and R$^1$ and R$^2$ may be the same or different and represent hydrogen, a straight chain alcohol or a branched chain alcohol having about 1 to about 4 carbon atoms. The molecular weight of the polyoxyalkylene amine may range from about 150 to about 6000.

The primary and secondary polyoxyalkylene amines of the invention may be present in the ink composition in an amount ranging from about 0 to about 8% by weight, and preferably are present in an amount ranging from about 0.5 to about 5% by weight. The viscosity of inks containing polyoxyalkylene amines should range between about 1.1 cP and about 2.5 cP for the same reasons as discussed in connection with the inks discussed above containing polyalkyleneimine/alkylene oxide block copolymer.

A number of polyoxyalkylene amines are commercially available. These include the Jeffamine® series available from Texaco Chemical Co. including ED600, ED-900, ED-2001, ED-4000, ED-6000, C-346, M-600, M2005, and M-2070. The Jeffamine® polyalkyleneamines contain primary amino groups attached to the terminus of a polyether backbone. The polyether backbone is based either on propylene oxide (PO), ethylene oxide (EO), or mixed EO/PO. The Jeffamine® family comprises monomers, diamines and triamines, which are available in a var of molecular weights ranging from 148 to 6000.

The Jeffamine® ED-Series products are polyether diamines which are based on a predominantly polyethylene oxide backbone. This imparts complete water solubility to each of the members of this series. The Jeffamine EDSeries products, except for Jeffamine ED-6000, have the structure:

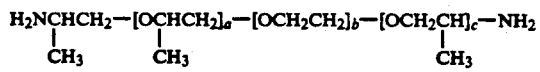

Some examples of the approximate a, b and c values and approximate molecular weights of Jeffamine® products are given below.

| Jeffamine Product | Approx. Value b | a + c | Approx. Mol. Wt. |
|---|---|---|---|
| ED-600 | 8.5 | 2.5 | 600 |
| ED-900 | 15.5 | 2.5 | 900 |
| ED-2001 | 40.5 | 2.5 | 2,000 |
| ED-4000 | 86.0 | 2.5 | 4,000 |
| ED-6000 | 131.5 | 2.5 | 6,000 |

Jeffamine ED-6000 has additional propylene oxide in the backbone, yet is still completely water soluble.

Another Jeffamine®, C-346, is represented by the following structure:

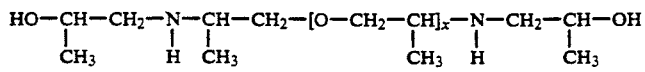

where x is about 2.6.

The ink vehicle of the invention is the major component of the composition. Any of a number of various ink vehicles may be employed. Generally, however, the ink vehicle contains water, more preferably deionized water, as the primary component. The ink vehicle may also contain cosolvents, humectants and/or additives which modify the properties of the ink composition such as, for example, to adjust viscosity, surface tension, drying time, etc. The cosolvent may be a water miscible organic solvent. Suitable water miscible organic solvents include amides, ethers, carboxylic acids, esters, alcohols, organosulfides, organosulfoxides, sulfones, dimethylsulfoxide, sulfolane, alcohol derivatives, carbitol, butyl carbitol, ether derivatives, amino alcohols, ketones, and other water miscible materials, as well as mixtures thereof. When mixtures of water and water miscible organic liquid are selected as the liquid vehicle, the water to organic ratio may be in any effective range, and typically is from about 100:0 to about 30:70, preferably from about 97:3 to about 50:50. Other non-water components of the liquid vehicle generally serve as humectants which have a boiling point higher than that of water (100° C.). These, for example, include ethylene glycol, propylene glycol, diethylene glycols, glycerine, dipropylene glycols, polyethylene glycols, and polypropylene glycols. Heterophase ink jet inks are also known.

The colorant may be any material which permits the development of visible images on a recording medium such as paper. Concentrations of colorant higher than 8% by weight can be detrimental because of the limited solubility of colorants in the ink vehicle. The colorant may include dyes such as acid dyes, reactive dyes and direct dyes, and pigments and the like. Generally, any effective dye, such as one of the direct dyes or the acid dyes, can be selected as the colorant, provided that it is compatible with the other ink components and is soluble in the ink vehicle. Examples of suitable dye include anthraquinones, monoazo dyes, disazo dyes, phthalocyanines, aza(18)annulenes, and formazan copper complexes. Particularly preferred dyes which may be used in the ink compositions of the invention include, for example, Food Black #2, Direct Black 168, Direct Blue 199, Acid Blue 9, Acid Red 249, Reactive Black 31, Direct Black 154, Reactive Red 180, Direct Blue 86, Acid Yellow 23 and Aizen Black 1000S.

As discussed above, the ink compositions of the present invention may also include additives in addition to the colorant, ink vehicle and the at least one of polyalkyleneimine/alkylene oxide block copolymer, primary polyoxyalkylene amine or secondary polyoxyalkylene amine.

Polymeric additives can be added to inks to enhance their viscosity or water fastness. Such additives include water soluble polymers such as gum arabic, polyacrylate salts, polymethacrylate salts, polyvinyl alcohols, hydroxy propylcellulose, hydroxyethylcellulose, polyvinylpyrrolidinone, polyvinylether, starch, polysaccharides, and the like. Polymeric additives may be present in inks in amounts of from 0 to about 5 percent by weight, and preferably from about 0.01 to about 2.5 percent by weight.

PEI derivatives such as those disclosed in U.S. Pat. Nos. 4,789,400 and 4,659,382 can also be used in the ink compositions of the present invention to further improve water fastness. PEI derivatives such as hydroxyethylated and hydroxypropylated PEI can be used in an amount of from about 0% to about 8% by weight and preferably from about 0.1% to about 5% by weight. When PEI derivatives are used, the pH of the inks should be adjusted so as to optimize the water fastness and to prevent precipitation of the dye-PEI complex which forms as the pH of the ink is lowered from about 10.0 to about 7.0. Preferably, the pH of the ink is maintained at about 8.0 to about 10.0. Hydroxyethylated PEI (HEPEI) and hydroxypropylated PEI (HPPEI) are available from Morton Thiokol and have molecular weights ranging from about 1000 to about 50,000.

Buffers such as N-tris(hydroxyamino) propane sulphonic acid and tris(hydroxymethyl) aminomethane (as disclosed in U.S. Ser. No. 07/701,272 filed simultaneously herewith, pH controlling agents such as acids or bases, phosphate salts, carboxylate salts, sulfite salts, amine salts, and the like, may also be added to control the pH the composition.

Other optional additives to inks include biocides such as Dowicil 150, 200, and 75, benzoate salts, sorbate salts, and the like, present in an amount of from about 0.0001 to about 4 percent by weight, and preferably from about 0.01 to about 2.0 percent by weight.

Inks can be prepared by any process suitable for preparing aqueous-based inks. For example, the ink ingredients can be mixed in the desired amounts and stirred until a uniform ink composition results (typically about 30 minutes, although the mixing/stirring time can be either greater or less than this period). While not required, the ink ingredients can be heated during mixing if desired. Subsequent to mixing and stirring, the ink composition generally is filtered to remove any solid or particulate matter. Any other suitable processes for preparing inks can also be employed.

The ink compositions of the invention preferably can be used in ink jet printing systems. Such inks are capable of being utilized without clogging or leaking in either the type of printing system which uses thermal energy to produce a vapor bubble in an ink-filled channel to expel a drop of ink, or the type of system which uses a piezoelectric transducer to produce a pressure pulse that expels droplets from a nozzle.

The invention will further be illustrated in the following, non-limiting examples, it being understood that these examples are intended to be illustrative only and that the invention is not intended to be limited to the materials, conditions, process parameters, and the like recited herein.

EXAMPLE 1

An ink composition is prepared containing 3% by weight Food Black #2, 5.25% by weight diethylene glycol, 4.00% by weight HEPEI-200 (a hydroxyethylated polyethyleneimine of molecular weight 10,000, available from Morton Thiokol, Inc), 3.00% by weight Jeffamine ® ED-600 (a polyether diamine of molecular weight 600 available from Texaco Chemical Co.), and 83.75% by weight deionized water. The composition has a viscosity of 1.50 cP, and a surface tension of 55.4 dynes-cm$^{-1}$. The resulting ink is filtered through a 0.45 μm membrane filter made of cellulose acetate available from CANLAB. The ink is printed on a Hewlett Packard (HP) DeskJet printer to give images of good print quality on a variety of office papers. The water fastness of this ink is found to be acceptable.

EXAMPLE 2

An ink composition is prepared containing 3% by weight Food Black #2, 3% by weight Jeffamine® ED-2001 (a polyether diamine of molecular weight 2000 available from Texaco Chemical Co.), 5.25% by weight diethylene glycol, and 88.75% by weight deionized water. The resulting ink is filtered as in Example 1. The ink is printed on an HP DeskJet printer to give images of good print quality on a variety of office papers.

EXAMPLE 3

An ink composition is prepared containing 3% by weight Food Black #2, 5.25% by weight diethylene glycol, 4.00% weight Jeffamine® ED-600 and 87.75% by weight deionized water. The resulting ink is filtered as in Example 1. The ink has a viscosity of 1.50 cP and a surface tension of 50.4 dynes-cm$^{-1}$. The ink is printed on a Xerox experimental thermal ink jet printer (300 spi) to give images of good print quality. On Champion Courtland paper, the ink drying times are measured as 19 seconds (wire side) and 15 seconds (felt side). The ink is found to have very good latency characteristics.

EXAMPLE 4

An ink composition is prepared containing 3% by weight Food Black #2, 5.25% by weight diethylene glycol, 5% by weight Jeffamine® ED-600, and 81.75% by weight deionized water. The resulting ink is filtered as in Example 1. The composition has a viscosity of 1.56 cP and a surface tension of 47.8 dynes-cm$^{-1}$. The ink is printed on an HP DeskJet printer to give images of good print quality on a variety of office papers. On Champion Courtland paper, the ink drying times are measured as 13 seconds (wire side) and 10 seconds (felt side).

EXAMPLE 5

An ink composition is prepared containing 3% by weight Food Black #2, 5.25% by weight diethylene glycol and 4% by weight of PEI(600)-PO(560)-EO(2400) (available from DKS International Company) in deionized water. The resulting ink is filtered as in Example 1. The ink is printed on a Xerox experimental thermal ink jet printer (300 spi) to give images of good print quality. The latency of the ink is found to be more than acceptable. Latency is measured to be six minutes without a humidity station and as long as sixty minutes under 80% humidity. On plain papers, the water fastness increased by 5% with respect to a similar ink containing no copolymer.

EXAMPLE 6

An ink composition is prepared containing 3% by weight Food Black #2, 5.25% by weight diethylene glycol, by weight Jeffamine® ED-2001 and 87.75% by weight of deionized water. The resulting ink is filtered as in Example 1. The ink has a viscosity of 1.72 cP and a surface tension of 56.6 dynes-cm$^{-1}$. The ink is printed on a Xerox experimental thermal ink jet printer (300 spi) to give images of good print quality. The ink is found to have acceptable latency characteristics. On Champion Courtland paper, the ink drying times are measured as 14 seconds (wire side) and 12 seconds (felt side).

EXAMPLE 7

An ink composition is prepared containing 3% by weight Aizen Black 1000S (available from Hodogaya), 5.25% by weight diethylene glycol, 4% by weight Jeffamine® ED-600 and 87.75% by weight of deionized water. The resulting ink is filtered as in Example 1. The ink has a viscosity of 1.50 cP and a surface tension of 49.6 dynes-cm$^{-1}$. The ink is printed on a Xerox experimental thermal ink printer (300 spi) to give images of good print quality. The ink is found to have acceptable latency characteristics. On Champion Courtland paper, the ink drying times are measured as 16 seconds (wire side) and 10 seconds (felt side).

EXAMPLE 8

An ink composition is prepared containing 3% by weight Food Black #2 (Bayer), 5.25% by weight diethylene glycol, 2% by weight Jeffamine® C-346 (a bis-hydroxypropyl derivative of Jeffamine D-230 which is an amine-terminated polypropylene glycol of molecular weight 230, available from Texaco Chemical Company), and 89.75% by weight of deionized water. The resulting ink is filtered as in Example 1. The composition has a viscosity of 1.28 cP and a surface tension of 43.7 dynes-cm$^{-1}$. The ink is printed on a Xerox experimental thermal ink jet printer (300 spi) to give images of good print quality. The ink is found to have acceptable latency characteristics.

EXAMPLE 9

An ink composition is prepared containing 3% by weight Food Black #2, 5.25% by weight diethylene glycol, 4% by weight Discole® N-518 (a polyethyleneimine-propylene oxide-ethylene oxide block copolymer available from DKS International Company), 0.06% by weight Discole N-506 (a polyethyleneimine-propylene oxide-ethylene oxide block copolymer available from DKS International Company), 2.43% of N-tris(hydroxyamino)propane sulphonic acid (buffer), and 85.26% by weight of deionized water. The resulting ink is filtered as in Example 1. The ink is printed on a Xerox experimental thermal ink jet printer (300 spi) to give images of good print quality. The ink is found to have acceptable latency and drying time characteristics.

EXAMPLE 10

An ink composition is prepared as in Example 9, except that no buffer is used. The ink is found to have similar latency and drying time characteristics. The drying time of this ink is measured on different papers at 4% moisture content. The drying is heat assisted (hot platen set at about 110°-115° F., vacuum 0.25 in., printhead 3.56 in./sec.) and the drying time is obtained from the offset properties of the printed image. An image which does not offset less than 0.050 OD (optical density) to another sheet of paper placed in contact with it is considered dry. The image is physically placed in contact with another sheet using pressure rollers. It is found that the drying times are 15, 21 and 25 seconds on the felt side of Hammermill Fore DP20, Champion Courtland and Champion Datacopy paper respectively (ink mass of 2 mg/cm$^2$).

EXAMPLE 11

An ink composition is prepared containing 3% by weight Food Black #2, 5.25% by weight diethylene glycol, 0.5% by weight Discole® N-518 and 91.25% by weight of deionized water. The resulting ink is filtered as in Example 1. The ink is printed on a Xerox experimental thermal ink jet printer (300 spi) to give images of good print quality. The ink is found to have acceptable latency characteristics.

COMPARATIVE EXAMPLE 12

Control for Inks Containing 4.25% Diethylene glycol and 3.0% Food Black #2

An ink composition is prepared containing 3% by weight Food Black #2, 5.25% by weight diethylene glycol, and 91.75% by weight of deionized water. The resulting ink is filtered as in Example 1. The ink is printed on Xerox experimental thermal ink jet printer (300 spi) to give images of good print quality. The ink is found to have acceptable latency characteristics. The drying time of this ink is measured as in Example 10. It is found that the drying times are 10, 31, and 40 seconds on the felt side of Hammermill Fore DP20, Champion Courtland and Champion Datacopy paper respectively.

EXAMPLE 13

An ink composition is prepared containing 3% by weight Food Black #2, 10.0% by weight ethylene glycol, 0.5% by weight Discole® N-518, 4% by weight of tris(hydroxymethyl)aminomethane available from Sigma Chemical Company, and 82.50% by weight of deionized water. The resulting ink is filtered as in Example 1. The ink is printed on a Xerox experimental thermal ink jet printer (300 spi) to give images of good print quality. The ink is found to have acceptable latency characteristics. The drying time of the ink is measured as in Example 10. The drying times are 9, 24, and 25 seconds on the felt side of Hammermill Fore DP20, Champion Courtland and Champion Datacopy paper, respectively.

COMPARATIVE EXAMPLE 14

Control for Drying Time Studies of Table A and Table B

An ink composition is prepared containing 3% by weight Food Black #2, 5.25% by weight diethylene glycol, 0.05% by weight Dowicil 200 (a biocide available from Dow Chemical Company), and 91.70% by weight of deionized water. The resulting ink is filtered as in Example 1. The ink is coated on Champion Courtland paper using a wire wound metering rod type #5 (0.0045 inches) available from Testing Machines International of Canada. This technique allows the printing of solid areas of optical densities and ink layers equivalent to those obtained using an ink jet printer. The optical density and showthrough of the printed image is measured using a Macbeth TR927 density meter. The drying time is obtained by measuring the time elapsed between coating the ink with the metering rod and the time at which the ink can be rubbed with a cotton swab without inducing smearing of the ink. The optical density, showthrough and drying time data for Example 14 are given in Table A and Table B.

EXAMPLES 15–24

Ink compositions are prepared and tested as in Example 14 with the exception that a small amount of a Jeffamine® additive is added to the ink. The percent by weight of additive and the additive are identified in Table A. The effects of the Jeffamine® additives on optical density, showthrough and drying time are also given in Table A. Jeffamine® ED-XXXX represents polyether diamines which are based on a polyethylene oxidepoly-propylene oxide backbone where XXXX represents the molecular weight of the Jeffamine® additive. Jeffamine® M-XXXX represents monoamine materials based on the same type of backbone.

EXAMPLES 25–40

Ink compositions are prepared and tested as in Example 14 with the exception that a small amount of a Discole® (polyethyleneimine-propylene oxide-ethylene oxide block copolymer) additive is added to the ink. The percent by weight of additive and the additive are identified in Table B. The effects of the Discole® additives on optical density, showthrough and drying time are also given in Table B.

RESULTS

Examples 14 to 40 demonstrate clearly the advantages of using materials of the invention in order to control the drying time of thermal ink jet (TIJ) inks.

TABLE A

Effect of Jeffamine Additives on Drying Times of TIJ Inks

| Example No. | Additive | Amount % | Optical Density | Showthough | Dry Time (sec) |
| --- | --- | --- | --- | --- | --- |
| 14 | Control | | W 1.15 | W 0.06 | W 20 |
| | | | F 1.09 | F 0.08 | F 13 |
| 15 | Jeffamine ED-600 | 4 | W 1.08 | W 0.10 | W 10 |
| | | | F 0.95 | F 0.10 | F 4 |
| 16 | Jeffamine ED-600 | 1 | W 1.15 | W 0.05 | W 15 |
| | | | F 1.03 | F 0.09 | F 6 |
| 17 | Jeffamine ED-900 | 4 | W 1.12 | W 0.06 | W 11 |
| | | | F 1.03 | F 0.09 | F 8 |
| 18 | Jeffamine M-900 | 2 | W 1.13 | W 0.08 | W 8 |
| | | | F 0.97 | F 0.10 | F 3 |
| 19 | Jeffamine M-4000 | 4 | W 1.16 | W 0.05 | W 23 |
| | | | F 1.05 | F 0.11 | F 10 |
| 20 | Jeffamine M-2005 | 4 | W 0.94 | W 0.28 | W <0.5 |
| | | | F 0.90 | F 0.20 | F <1 |
| 21 | Jeffamine M-2005 | 1 | W 0.96 | W 0.11 | W 1 |
| | | | F 0.91 | F 0.15 | F <0.5 |
| 22 | Jeffamine M-2005 | 0.1 | W 1.08 | W 0.07 | W 3 |
| | | | F 1.03 | F 0.09 | F 3 |
| 23 | Jeffamine M-2070 | 4 | W 1.08 | W 0.06 | W 11 |
| | | | F 1.02 | F 0.08 | F 4 |
| 24 | Jeffamine M-2070 | 2 | W 1.15 | W 0.06 | W 12 |
| | | | F 1.04 | F 0.09 | F 5 |

W = wire side
F = felt side

TABLE B

Data on Effect of Discole Additives on Drying Time of TIJ Inks

| Example No. | Additive | Amount % | Optical Density | Showthough | Dry Time (sec) |
| --- | --- | --- | --- | --- | --- |
| 14 | Control | | W 1.15 | W 0.06 | W 20 |
| | | | F 1.09 | F 0.08 | F 13 |
| 25 | Discole N-503 | 4 | W 0.98 | W 0.09 | W <1 |
| | | | F 0.92 | F 0.12 | F <1 |
| 26 | Discole N-503 | 1 | W 0.98 | W 0.09 | W <1 |
| | | | F 0.94 | F 0.11 | F <1 |
| 27 | Discole N-503 | 0.1 | W 1.09 | W 0.06 | W 9 |
| | | | F 1.13 | F 0.07 | F 7 |
| 28 | Discole N-506 | 4 | W 0.93 | W 0.10 | W <1 |
| | | | F 0.88 | F 0.14 | F <0.5 |
| 29 | Discole N-506 | 1 | W 1.04 | W 0.09 | W 1 |
| | | | F 0.98 | F 0.10 | F <1 |
| 30 | Discole | 0.1 | W 1.12 | W 0.06 | W 13 |

TABLE B-continued

Data on Effect of Discole Additives on Drying Time of TIJ Inks

| Example No. | Additive | Amount % | Optical Density | Show-though | Dry Time (sec) |
|---|---|---|---|---|---|
|  | N-506 |  | F 1.06 | F 0.09 | F 6 |
| 31 | Discole | 4 | W 0.95 | W 0.08 | W <1 |
|  | N-509 |  | F 0.91 | F 0.10 | F <0.5 |
| 32 | Discole | 1 | W 1.10 | W 0.07 | W 8 |
|  | N-509 |  | F 1.01 | F 0.09 | F 4 |
| 33 | Discole | 4 | W 1.11 | W 0.06 | W 11 |
|  | N-512 |  | F 1.01 | F 0.10 | F 5 |
| 34 | Discole | 4 | W 1.14 | W 0.06 | W 12 |
|  | N-515 |  | F 1.03 | F 0.08 | F 6 |
| 35 | Discole | 4 | W 1.11 | W 0.06 | W 12 |
|  | N-518 |  | F 1.06 | F 0.08 | F 11 |
| 36 | Discole | 4 | W 1.12 | W 0.08 | W 21 |
|  | N-520 |  | F 1.10 | F 0.08 | F 9 |
| 37 | Discole | 4 | W 0.99 | W 0.16 | W <1 |
|  | 206 |  | F 0.95 | F 0.12 | F <1 |
| 38 | Discole | 1 | W 1.10 | W 0.07 | W 5 |
|  | 206 |  | F 0.94 | F 0.08 | F 2 |
| 39 | Discole | 0.1 | W 1.07 | W 0.05 | W 11 |
|  | 206 |  | F 1.07 | F 0.07 | F 6 |
| 40 | Discole | 4 | W 1.15 | W 0.06 | W 17 |
|  | W-3225 |  | F 1.06 | F 0.09 | F 8 |

While the invention has been described with particular reference to preferred embodiments, the invention is not intended to be limited to the specific examples given, and other embodiments and modifications can be made by those skilled in the art without departing from the spirit and scope of the invention.

What is claimed is:

1. An ink composition comprising an ink vehicle, a colorant, and at least one member selected from the group consisting of a polyalkyleneimine/alkylene oxide block copolymer and a primary or secondary polyoxyalkylene amine.

2. The composition of claim wherein said member is polyalkyleneimine/alkylene oxide block copolymer.

3. The composition of claim 1, comprising said polyalkyleneimine/alkylene oxide block copolymer and said primary or secondary polyoxyalkylene amine.

4. The composition of claim 1, wherein said member is polyoxyalkylene amine.

5. The composition of claim 1, wherein said polyoxyalkylene amine is present in an amount from about 0% by weight to about 8% by weight.

6. The composition of claim 1, wherein said polyoxyalkylene amine is A-$B_y$-C, wherein A is $R^1NH(C_nH_{2n})$, B is an alkoxy represented as $OC_nH_{2n}$, C is $NHR^2$, y is 1 to a value to impart a molecular weight of about 6000, where if y is greater than 1 the alkoxy may be the same or different, n=1 to 4, and $R^1$ and $R^2$ are the same or different and represent hydrogen, a straight chain alcohol or a branched chain alcohol having from 1 to 4 carbon atoms.

7. The composition of claim 1, wherein said polyoxyalkylene amine has a molecular weight of at least about 148.

8. The composition of claim wherein said block copolymer is present in an amount ranging from about 0.01 to about 8% by weight.

9. The composition of claim 1, wherein said block copolymer has a molecular weight between about 1000 and about 300,000.

10. The composition of claim wherein said colorant is selected from the group consisting of dyes and pigments.

11. The composition of claim 1, wherein said ink vehicle comprises water, a humectant and a cosolvent.

12. The composition of claim 1, wherein a surface tension of the composition is between about 30 and about 60 dynes/cm.

13. The composition of claim 1, wherein a viscosity of the composition is between about 1.1 and about 5 centipoise.

14. The composition of claim 1, wherein the polyalkyleneimine/alkylene oxide block copolymer is a polyethyleneimine/propylene oxide/ethylene oxide block copolymer.

15. The composition of claim 1, wherein the colorant is soluble in the ink vehicle.

16. The composition of claim 15, wherein the ink vehicle contains water as its primary component.

17. The ink composition of claim 1, wherein the colorant is selected from the group consisting of acid dyes, reactive dyes, and direct dyes.

18. An ink composition comprising about 80% to about 99% by weight of an ink vehicle, about 1% to about 8% of a colorant, and about 0.01% to about 8% by weight of at least one member selected from the group consisting of polyethyleneimine/propylene oxide/ethylene oxide block copolymer, a primary polyoxyalkylene amine and a secondary polyoxyalkylene amine.

19. The composition of claim 18, wherein said polyoxyalkylene amine is A-$B_y$-C, wherein A is $R^1NH(C_nH_{2n})$, B is an alkoxy represented as $OC_nH_{2n}$, C is $NHR^2$, y is 1 to a value to impart a molecular weight of about 6000, where if y is greater than the alkoxy may be the same or different, n=1 to 4, and $R^1$ and $R^2$ are the same or different and represent hydrogen, a straight chain alcohol or a branched chain alcohol having from 1 to 4 carbon atoms.

20. The composition of claim 18, wherein said primary or secondary polyoxyalkylene amine has a molecular weight of at least 148.

21. The composition of claim 18, wherein said colorant is selected from the group consisting of dyes and pigments.

22. The composition of claim 18, wherein said ink vehicle comprises water, a humectant and a cosolvent.

23. A method of ink jet printing, comprising jetting an ink composition onto a substrate, the ink composition comprising an ink vehicle, a colorant, and at least one member selected from the group consisting of polyalkyleneimine/alkylene oxide block copolymer, and a primary, or secondary polyoxyalkylene amine.

24. The method of claim 23, wherein said polyalkyleneimine/alkylene oxide block copolymer is a polyethyleneimine/propylene oxide/ethylene oxide block copolymer.

25. The method of claim 23, wherein said ink composition is jetted from a thermal ink jet.

26. The method of claim 23, wherein said ink composition is jetted from a piezoelectric ink jet.

27. The method of claim 23, wherein said ink composition comprises about 80% to about 99% by weight of said ink vehicle, about 1% to about 8% by weight of said colorant, and about 0.01% to about 8% by weight of said at least one member.

* * * * *